May 28, 1968     F. V. BOOKOUT     3,385,569

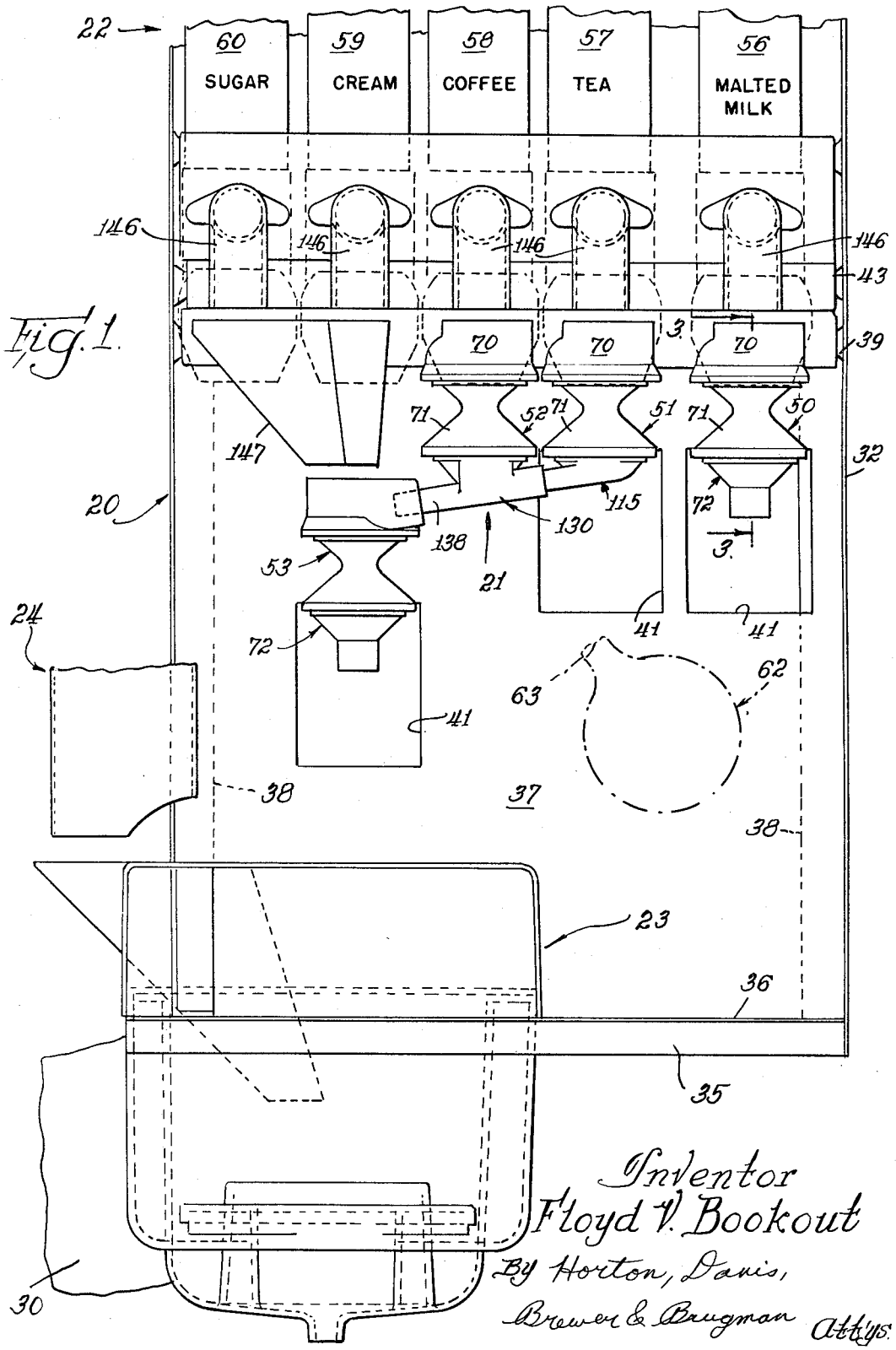

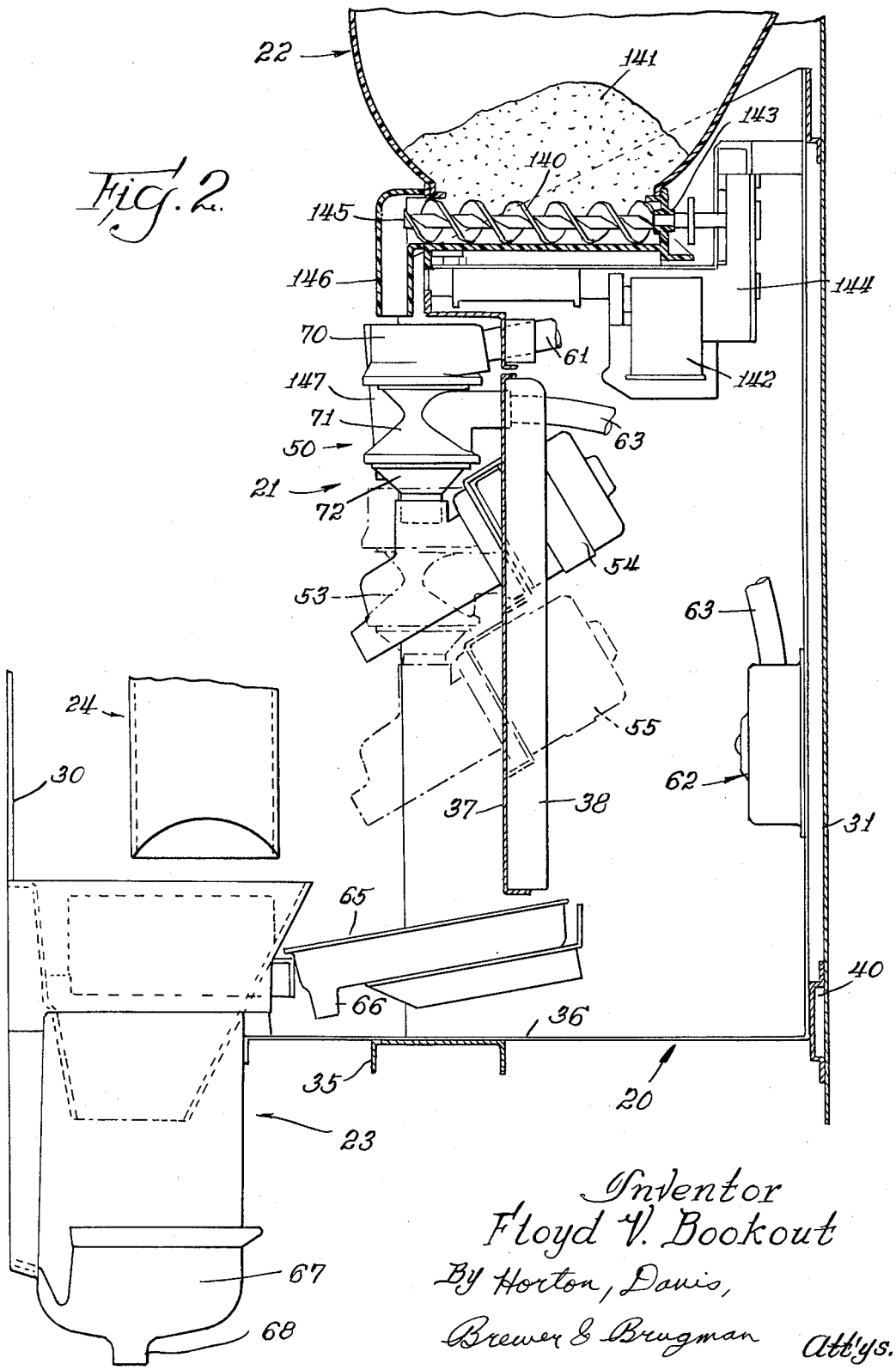

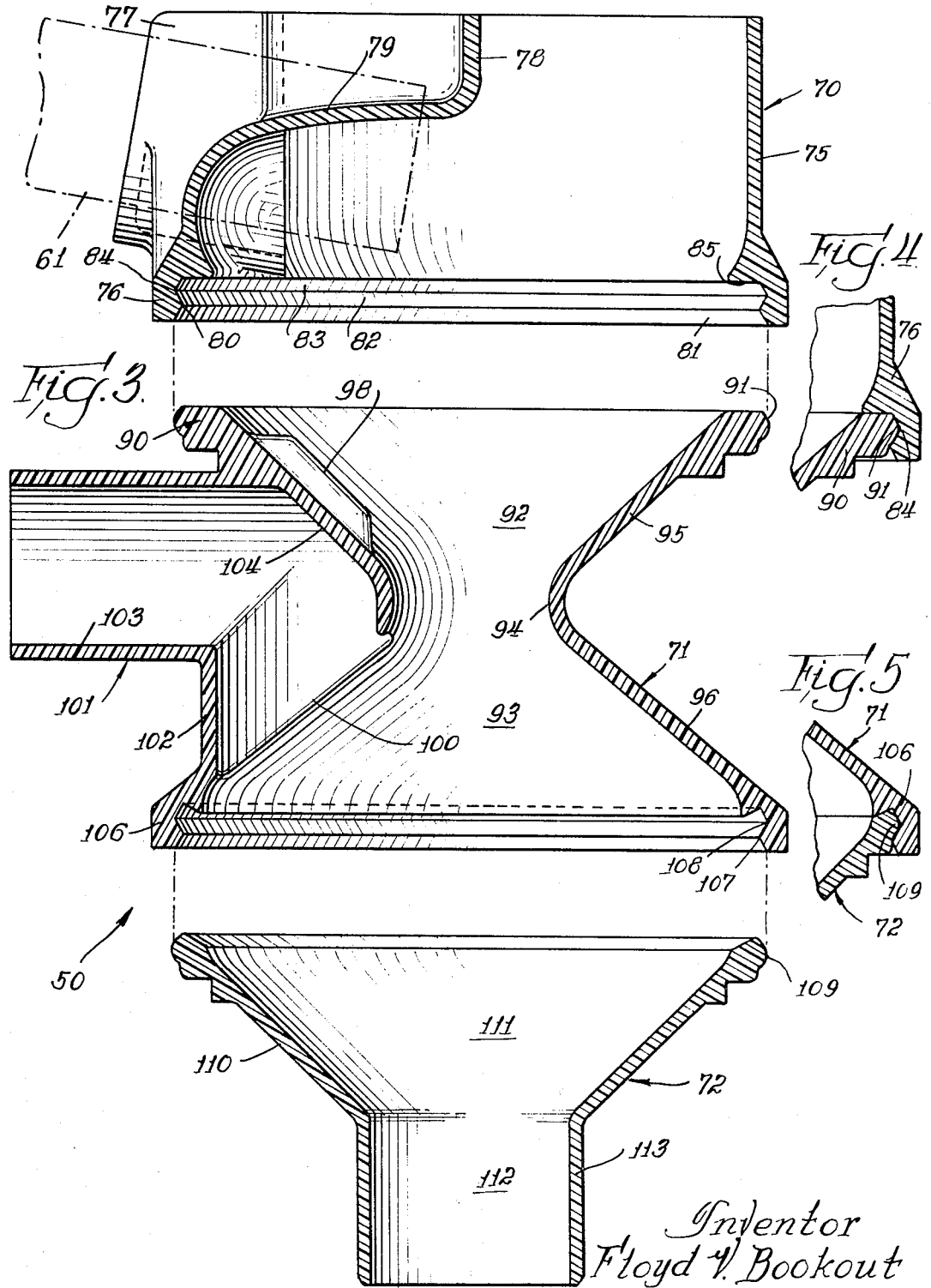

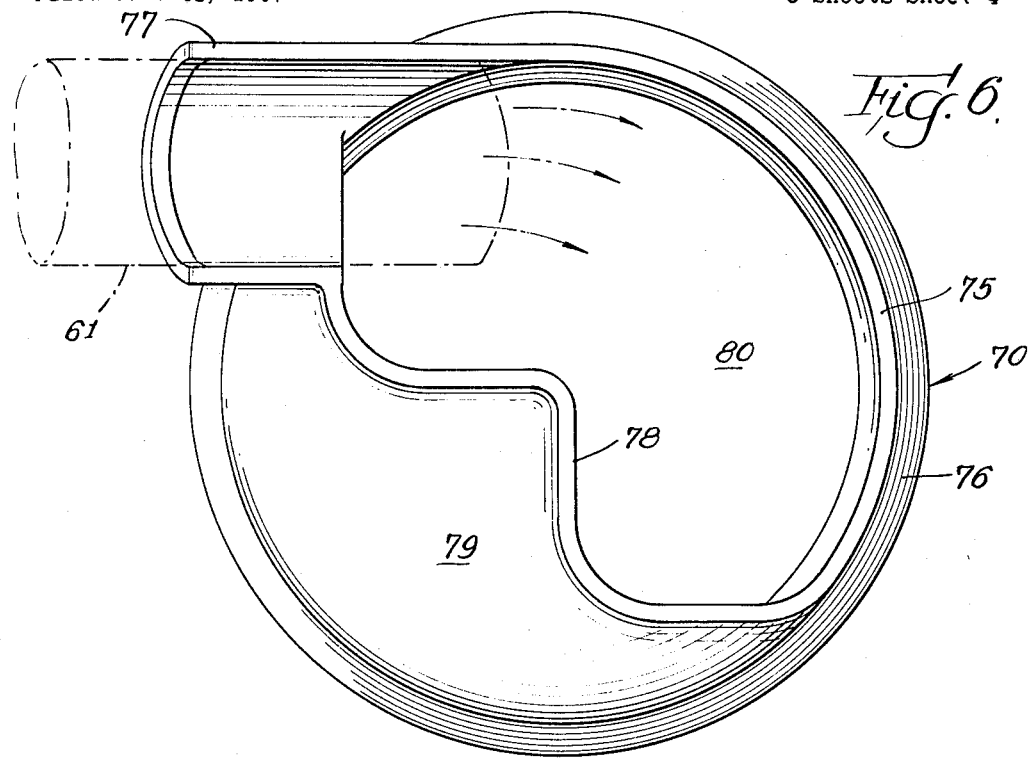
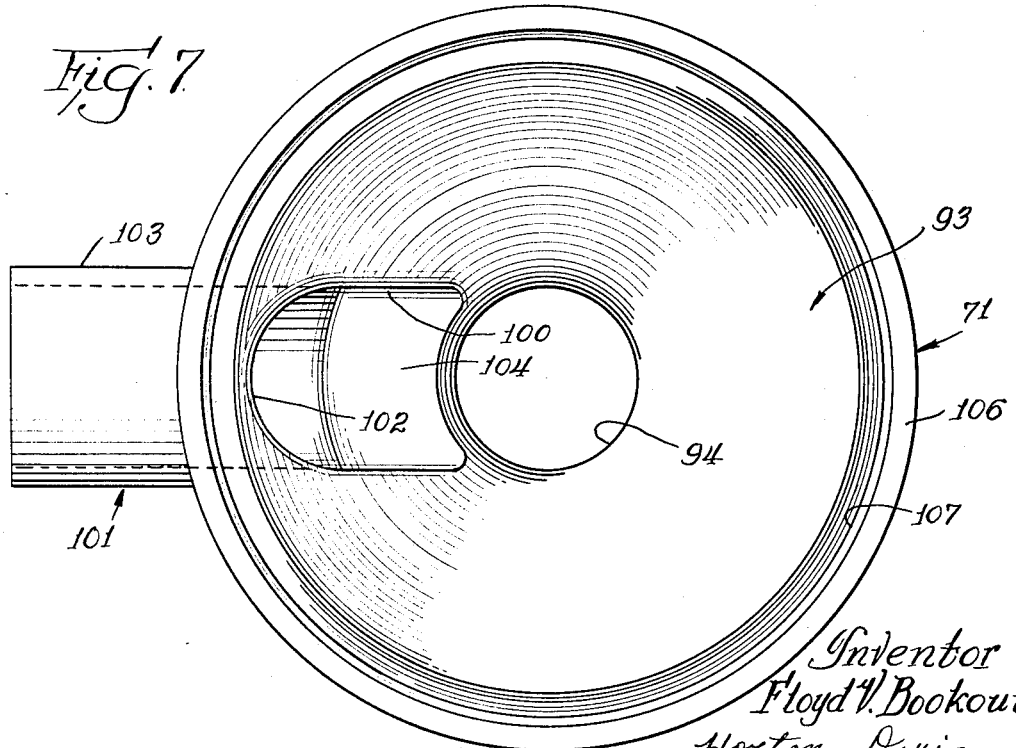

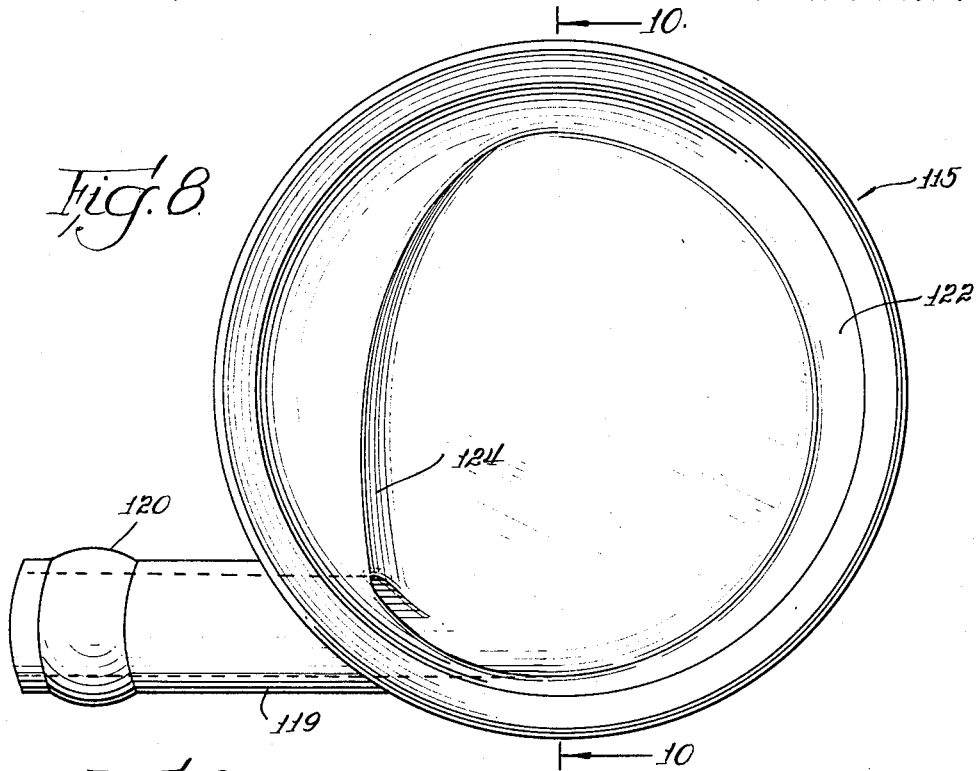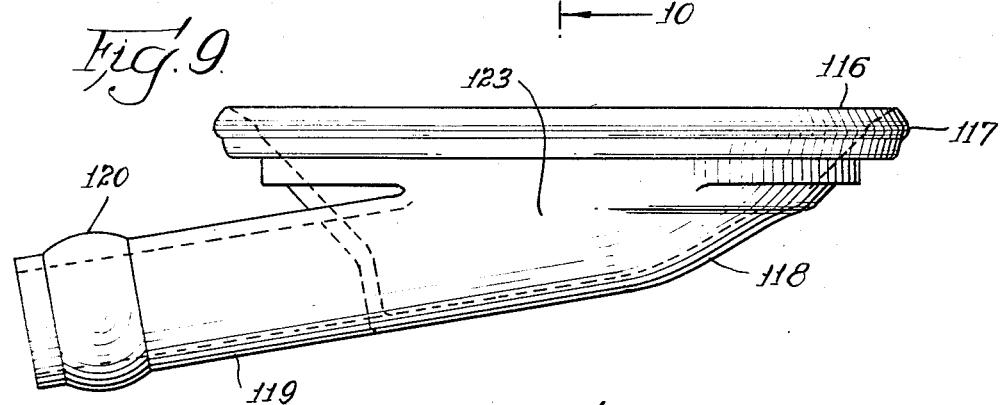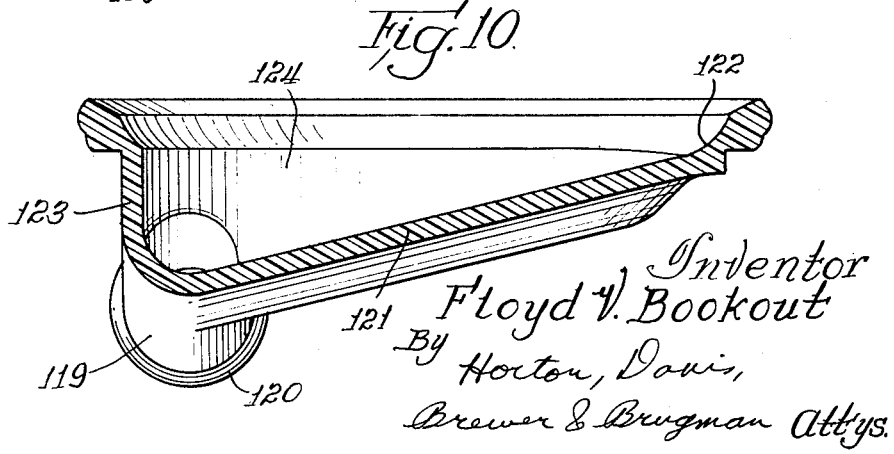

MIXING APPARATUS FOR BEVERAGE

Filed Jan. 11, 1967     6 Sheets-Sheet 6

Inventor
Floyd V. Bookout
By Horton, Davis,
Brewer & Brugman Attys.

United States Patent Office 3,385,569
Patented May 28, 1968

3,385,569
MIXING APPARATUS FOR BEVERAGE
Floyd V. Bookout, Arlington Heights, Ill., assignor to Rock-Ola Manufacturing Corporation, Chicago, Ill., a corporation of Delaware
Filed Jan. 11, 1967, Ser. No. 608,611
13 Claims. (Cl. 259—60)

ABSTRACT OF THE DISCLOSURE

Apparatus for intermixing dry and liquid beverage forming ingredients, utilizing one or more self-cleaning mixing devices having internal chambers productive of successive converging and diverging vortex flow of ingredients therethrough to produce homogeneous solution of such ingredients and including means for trapping and removing vaporous and dry particles released by such ingredients.

---

This invention relates generally to beverage dispensing apparatus and more particularly to improved means for intermixing gravitationally moving beverage forming ingredients.

Automatic coin operated vending machines for dispensing selected beverages and/or liquid foods such as coffee, tea, milk, fruit juices, hot soup, hot chocolate and various flavored cold drinks and the like, are a familiar part of the American scene. Generally speaking, past developments for such machines have relegated the dispensing of cold drinks to one type of machine and the dispensing of hot drinks, such as coffee, soup, tea, hot chocolate, etc. to a separate class of machines. In all such vending machines, however, it is general practice to mix, by appropriate mechanism, measured quantities of instant mix dry flavoring ingredients with measured amounts of liquids, in which such dry ingredients are dissolved. The ingredients to be admixed are usually selected by the customer and subsequently dispensed in a cup or drinking vessel in response to the deposit of a predetermined denomination of coins. In machines for dispensing hot drinks, one of the primary problems and difficulties confronting the vending machine industry has been combating moisture vapor such as steam released by the hot liquids. Such vapors not only infiltrate various electrical circuits and mechanisms of the vending machine, causing rust and operational deterioration but more seriously serve to contaminate the dry mix ingredients, causing the same to cake and harden in their storage containers, and impairing free flow thereof into devices for mixing the same with liquid. Of additional difficulty, the dry ingredients tend to dust and release particles into the atmosphere which coat the vending mechanisms. The dust problem is compounded materially by any released liquid vapors which combine with the dry ingredient particles causing them to harden and cake on various mechanisms.

The seriousness of the vapor or steam problem which accompanies the use of hot liquids in automatic vending machines has been somewhat lessened by relatively recent developments in which mixing devices receptive of liquid and dry flavoring ingredients are coupled to means for exhausting the atmosphere within and about the same. Consequently by such developments dry ingredient and vapor particles released to the atmosphere are now capable of being captured and removed to relatively harmless locations. While such developments have been generally successful for their intended purposes, recent advances in the beverage forming ingredient art and more particularly the advent of improved "cold drink" mixes, soluble in cold water for forming non-carbonated beverages, such as milk shakes and fruit flavored drinks, have given rise to additional problems not previously confronted in this art.

Generally speaking such problems stem mainly from the extra fine particle size of the dry ingredients used in these "cold drink" mixes. This characteristic produces abnormal dusting and release of the dry particle fines to the atmosphere, which problem is greatly accentuated when the "cold drink" mixes are used in machines for dispensing both hot and cold drink mixtures. In such circumstances, vapors escaping from the hot liquids readily combine with the increased quantities of airborne particles released by cold drink mixes, thereby to rapidly and seriously contaminate the operating mechanisms and elements of the vending equipment.

The above-noted dusting problem has greatly compounded the problem of providing mixing means capable of rapidly and completely dissolving the dry ingredients to avoid troublesome dusting while also accommodating hot drink mixes and avoiding the release of steam or liquid vapors. Experience has shown that the fine particle size of the "cold drink" mixes creates an increased tendency of the dry ingredients to cling to the walls of previously known mixing devices, a condition which is operationally unsatisfactory, particularly from a sanitary standpoint.

The present invention is addressed to the above-noted difficulties and principally involves improved combinations of elements for mixing apparatus including novel mixing means whereby dry powder mixes may be introduced directly into a liquid solvent therefor in such a manner as to substantially lessen the tendency of the powdered ingredients to release dry particles into the atmosphere and/or adhere to the surfaces of the mixing means. Additionally such improved mixing means is adapted to intermix hot liquids and dry flavoring ingredients for the production of hot mix beverages while controlling and minimizing the release of liquid vapor and dry ingredient particles into the atmosphere. In both instances, the mixing apparatus of this invention produces improved homogeneous mixture of the hot and cold mix ingredients with the respective hot and cold liquid solvents therefor so as to produce end drink products of superior quality.

In brief, the improved apparatus of this invention comprises an improved combination of mixing means for use in hot and cold drink vending machines; each mixing means comprising plural interchangeable vessel sections or components to promote economy of manufacture, assembly and ease of cleaning. In essence, the selectively combinable sections of the improved mixing means comprise a central dual bowl section of substantially hourglass interior configuration which creates reversing vortex flow of ingredients therethrough. Vapor and dry particle trap means communicate with the interior of the mixing means and with air circulating means for trapping and removing vaporous and dry ingredient particles from the atmosphere within and about the mixing means. A hood or top cover section is disconnectably mounted over the upper end of the central section and adapted for selected positioning thereon to accommodate various installation conditions. In similar fashion, a plurality of bottom sections are provided, each selectively attachable to the lower end of the central section. The bottom sections are formed with various outlet means and thereby serve to control both the direction of liquid flow from the mixing means and regulate retention time of ingredients therewithin. Selectable arrangement of the various component sections of the improved mixing device hereof accommodates the same to mixing dry ingredients with both hot and cold liquids, principally water, in a single beverage dispensing mechanism, all in a new and improved manner.

An important object of this invention is to provide improved apparatus having means for intermixing dry and liquid beverage forming ingredients to form homogeneous solution thereof.

Another important object of this invention is to provide improved mixing means as aforesaid, particularly adapted for the intermixture of dry powdered ingredients with hot and cold liquids.

An additional important object of this invention to provide improved mixing means for automatic vending machines and the like, which includes means for trapping ingredient particles released into the atmosphere by the ingredients intermixed therein.

Still another important object of this invention is to provide improved mixing means for intermixing powdered dry ingredients and cold liquids which is featured by an improved mixing chamber formation capable of self-cleaning operation.

Another object of this invention is to provide an improved mixing device capable of intermixing hot and/or cold liquids with powdered ingredients in a manner to substantially prevent the release of dry ingredient and vaporous particles into the atmosphere about the device and which cooperates with means for positively removing such particles to a position remote of the mixing device.

Having thus described the present invention, the best mode presently contemplated for practicing and carrying out its teachings and features will now be described in conjunction with a preferred embodiment thereof illustrated in the accompanying drawings, from which description the above and further objects, features and advantages of this invention will be recognized.

In the drawings:

FIGURE 1 is a view in front elevation of mixing and vending stages for automatic vending machines according to this invention;

FIGURE 2 is a view in side elevation of the assembly illustrated in FIGURE 1;

FIGURE 3 is an enlarged cross-sectional view taken substantially along vantage line 3—3 of FIGURE 1, to illustrate the features of the improved mixing device of this invention and showing the several elements therefor in exploded arrangement;

FIGURE 4 is an enlarged partial view in cross-section showing the assembled relationship of the upper and central sections of the mixing device seen in FIGURE 3;

FIGURE 5 is a partial, enlarged sectional view, similar to FIGURE 4, showing the assembled relationship of the central and lower mixing device sections shown in FIGURE 3;

FIGURE 6 is a top plan view of the upper section of the mixing device illustrated in FIGURE 3;

FIGURE 7 is a bottom plan view of the central section of the mixing device illustrated in FIGURE 3;

FIGURE 8 is a top plan view of a lateral discharged bottom section for the mixing device illustrated in FIGURE 3;

FIGURE 9 is a side elevational view of the lateral discharge bottom section illustrated in FIGURE 8;

FIGURE 10 is a cross-sectional view taken substantially along vantage line 10—10 of FIGURE 8 and looking in the direction of the arrows thereon;

Figure 11:
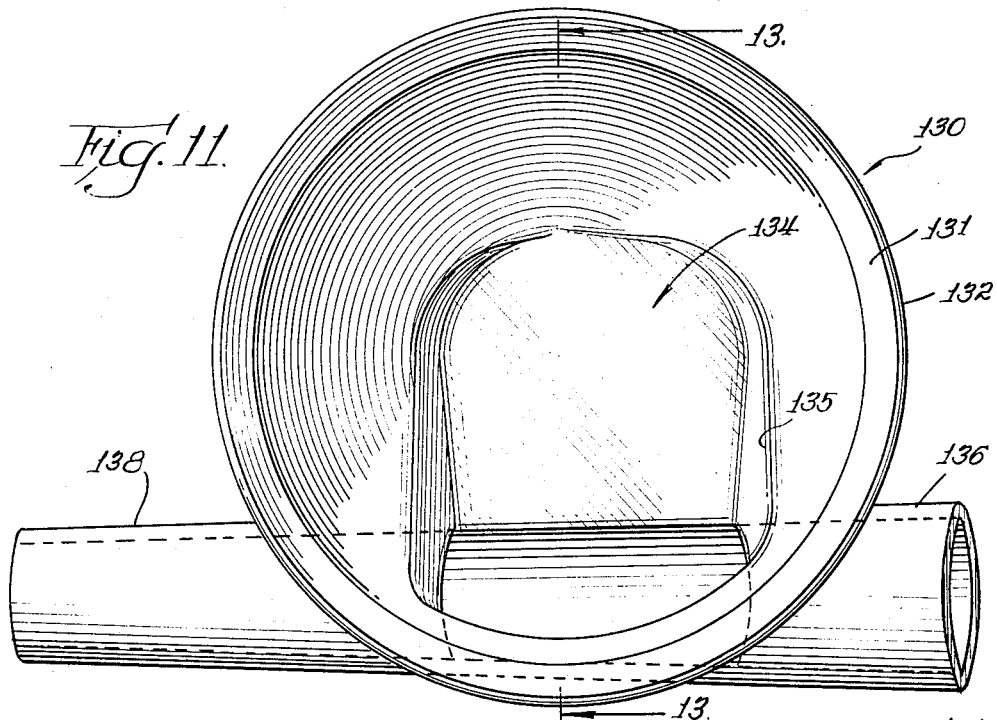
FIGURE 11 is a top plan view of a modified flow-through bottom section for the mixing device illustrated in FIGURE 3.

Turning now to the particulars of the preferred embodiment of the present invention illustrated in the accompanying drawings, initial reference is made to FIGURES 1 and 2 wherein the same is set out in conjunction with pertinent portions of a typical mixed drink, coin operated vending machine. As therein shown, a supporting framework means, generally indicated at 20, is mounted within the hollow interior of a vending machine cabinet and serves to support mixing apparatus 21 according to this invention. As best indicated in FIGURE 1, such apparatus 21 is disposed generally horizontally across the upper interior of the vending machine cabinet, beneath dry ingredient storage and dispensing means 22 and slightly above and behind a vending stage means 23 having associated cup drop means 24 (see FIG. 2).

According to recognized practice, the vending machine of the class above referred to generally comprises an enclosed cabinet having a conventionally hinged front door including front panel 30, an opposing rear wall panel 31 disposed parallel to the front panel and a pair of parallel spaced side walls or panels, such as the right-hand side wall panel 32, looking at the front of the machine as illustrated in FIGURE 1. Additionally, appropriate top and bottom closures or walls (not shown herein) suitably interconnect the back and side walls of the cabinet to provide in conjunction with the closable front door and appropriate support framing therefor, a generally rectangular shaped upright box or cabinet having a hollow interior for accommodating various automatic vending machine mechanisms therewithin. For purposes of the present description, the specifics of the vending machine cabinet are of no particular significance other than to provide overall protective enclosure and support for the mixing apparatus of this invention and other related mechanisms familiarly employed in conventional automatic coin operated vending machines of this character.

As best shown in FIGURE 1 of the drawings, the supporting framework means 20 generally comprises a rigid fabricated network of metal supporting panels and frame members mounted within the upper interior of the vending machine cabinet and undersupported thereat on a horizontal rail member 35 carrying a planar shelf wall 36 disposed horizontally across the lower interior of the cabinet. The particular embodiment of means 20 illustrated is featured by a vertically disposed planar mounting panel 37 carried between laterally spaced angle iron brackets 38, 38 and located slightly above and in spaced relation to the horizontal shelf 36. In addition to the under support of rail member 35, assembly 20 is positively anchored to and supported on the rear and side panels 31 and 32 of the vending machine cabinet; being joined thereto as by suitable connector means 39 and 40.

It will be particularly noted from FIGURE 1 of the drawings that mounting panel 37 conveniently carries the mixing apparatus 21 thereon adjacent its upper margins and is formed preferably with three rectangular shaped openings 41, 41 spaced and located appropriately for purposes which will be more fully understood from descriptive materials which follow. Disposed across the top of the counting panel 37 and extending rearwardly therefrom is a horizontal commodity shelf 43 on which the dry ingredients storage and dispensing means 22 is mounted.

The mixing apparatus 21 according to the particular illustrated preferred embodiment thereof, generally comprises a combination of several (four herein) separate and distinct mixing devices or means 50, 51, 52 and 53, cooperatively arranged and related with one or more electrically motorized whipper assemblies 54 and 55, each mounted in one of the three openings 41 in panel 37. A plurality of individual canisters or bins 56, 57, 58, 59 and 60 are adapted to contain dry ingredients as respectively labeled in FIGURE 1, and are cooperatively arranged over the several mixing devices, so that each bin is adapted to discharge dry ingredients into a respectively associated one of the several illustrated mixing devices 50–53. While the structure and functional arrangement of the several mixing devices are similar and will be described in specific detail hereinafter, it is noteworthy that the two mixing devices 50 and 53 illustrated are similarly organized and arranged for substantially vertical flow and discharge of ingredients therefrom while contrastingly the other two mixing devices 51 and 52 are each adapted for modified lateral discharge flow. In fact devices 51 and 52 are arranged in tandem or series relationship with each other and the one mixing means 53 receives the discharge of the two mixing devices 51 and 52. This particular illustrated organization and arrangement of the several mixing devices 50–53 is not exclusive and is presented herein only for purposes of demonstrating the unique versatility of the improved mixing apparatus of this invention. As such, it will be recognized readily that the mixing apparatus of this invention may be varied widely, both as to the number of individual mixing devices combined therein as well as to component arrangement of each thereof, in accordance with the dictates and demands of particular vending situations as will be amplified subsequently.

As previously mentioned, each of the mixing devices 50–53 comprises a multiple component assembly, preferably having an upper top or hood section, an intermediate mixing section and a bottom section; the three sections thereof comprising detachable components susceptible of selected geometric arrangement and association, as will be described in greater detail presently. Essentially, each of the mixing devices is adapted to receive both wet and dry ingredients through the upper end thereof for subsequent intermixture therein and discharge therefrom, as potable beverages. In this latter regard, the several mixing devices 50–53 are suitably coupled to the vending stage 23 by conventional plastic or tubular conduit means (not shown) according to familiar practice in this field.

Referring again to FIGURE 2 in particular, it will be understood that selectively controlled hot or cold liquid, typically water, is supplied to the three mixing devices 50, 51 and 52, in the particular illustrated embodiment, via supply conduit means 61 of preferably comprising flexible plastic tubing which discharge liquid tangentially into the upper hood section of each of such mixing devices. Conduit means 61 also are appropriately coupled to a supply source of liquid, either hot or cold, and suitable flow control means, operably responsive to selected cycling mechanisms to produce periodic flow of measured amounts of liquid therethrough in accordance with a predetermined operational vending cycle for the vending machine, in a known manner. Of additional significance is the coupling of the interior of each of the mid-sections of the several individual mixing devices 50–53 to air circulating means such as blower means 62 shown mounted adjacent the rear wall 31 of the vending machine cabinet for discharge externally of the latter; the blower means 62 being interconnected with the several mixing devices via flexible conduits of the type indicated at 63 in FIGURE 2 of the drawings. Generally speaking, in employing such a blower means for evacuating the atmosphere within and about the several mixing devices in accordance with such objective of this invention, the blower means may be constantly energized or periodically energized in accordance with predetermined time periods of the vending cycle, again, according to known practices in this art.

In addition to the several components and elements of the mixing apparatus 21, as above described, the supporting framework means 20 also carries and supports an elongated drip pan 65 over the horizontal shelf wall 36 and beneath the several mixing devices 50–51 as principally illustrated in FIGURE 2 of the drawings. Pan means 65 includes a discharge outlet means 66 which is coupled via suitable flexible hose or conduit, not shown, to an underdisposed drip bucket. Drippings and overflow gravitating from the several mixing devices are thereby readily captured and conveyed to the central drip bucket or container and eventually removed from the vending machine as at servicing time. In this respect, it will be noted that the vending stage 23 also includes a drip pan portion 67 at the lower end thereof, also having a discharge outlet means 68 whereby spillage at the vending stage, as when filling a cup or container thereat, is similarly conveyed to the underdisposed drip bucket.

Having thus described the general arrangement and makeup of the mixing apparatus 21 according to this invention, particularly as the same is embodied in an automatic vending machine as described, the particulars and features of the novel mixing means 50–53 will now be set forth; to which purpose reference is now made to FIGURES 3 through 11 of the drawings.

As shown specifically in FIGURES 3–7, mixing means 50 therein illustrated, comprises an upper or hood section 70, a central intermediate or mid-section 71 and a bottom section 72, all adapted for detachable interconnection as previously related. Preferably, such three sections are formulated as by molding low density plastic materials of a semi-rigid nature having a fair degree of flexibility and elasticity, general inertness to liquid and absorption and capable of withstanding heat in the order of 200° F. at least for short intermittent periods. Typical materials found satisfactory for this purpose are low density polyethylene and polypropylene plastics, molded with a wall thickness of approximately one-sixteenth of an inch and having highly polished internal surfaces.

As best illustrated in FIGURES 3 and 6 of the drawings, the hood section 70 as therein illustrated, is molded or otherwise formed to comprise a generally annular member having a semi-cylindrical side wall portion 75 which extends partially around the circumference thereof and which merges integrally at its base end with an enlarged base or locking ring portion 76 formed as an uninterrupted annulus. At one end, the side wall portion 75 merges integrally with a tangentially related semi-cylindrical inlet trough portion 77 which is open at its upper side to receive liquid supply tubing 61 therein, whereby liquid such as water discharged from tubing 61 is directed tangentially along the interior side walls of portion 75, as particularly illustrated in FIGURE 6 of the drawings. At its other end, the semi-cylindrical side wall portion 75 merges with a generally S-shaped curtain wall portion 78 and a cover wall portion 79; the curtain wall 78 serving with the upper reaches of side wall portion 75 to define therebetween an open generally L-shaped vacancy or opening 80 in the top of the hood member which is otherwise generally enclosed. It will be noted especially that the several portions above-described are all integrally related as a unitary molding with the cover wall portion 79 integrally merging with the lower edge of the curtain wall portion 78 and with a substantially semi-circular segment of the base portion 76 and wall of the inlet portion 77. It further will be noted that the intersection of several above-described portions of the hood section 70 are radiused generously to avoid sharp corners which assists in maintaining sanitary conditions and promotes ease of cleaning.

As indicated, the generally L-shaped opening 80 is provided through the upper wall 79 of the hood member. It is through such opening that dry ingredients discharged from the overdisposed canisters of the storage means 22 enters the mixing means, falling thereinto by gravity. The provision and shaping of the opening 80 accommodates selective rotational orientation of the cover or hood member so as to dispose the water inlet portion 77 thereof at various positions while still accommodating the gravitational fall of dry ingredients through opening 80 without reorientating the canisters of the dry storage means 22. This arrangement will be particularly appreciated from FIGURE 1 of the drawings, wherein the hood sections on mixing means 50, 51 and 52 are all oriented alike so that the related inlet means thereof are aligned along parallel axes substantially transverse to the plane of FIGURE 1, while contrastingly the hood section and water inlet of the mixing means 53 are oriented at substantially right angles to the hood sections of the mixing devices 50–52.

As previously indicated, the several sections or components of the mixing means 50 are designed and intended for detachable interconnection, and to that end, as shown on the hood section 70 of FIGURE 3, the annular base portion 76 thereof is formed with a double-step internal locking ring defining the internal configuration of such base portion. Specifically, it will be noted from the showing of FIGURE 3 and as amplified by the enlarged partial view set out in FIGURE 4 of the drawings, that the internal annular wall of the base portion 76 is provided with an inwardly set ridge 80 adjacent the lowermost end thereof, defined by the intersection of angularly disposed annular surfaces 81 and 82. Surface 82 also intersects with a third annular surface 83 located axially inwardly thereof to form an annular depression or locking groove having a bottom apex indicated at 84. Immediately above the axial termination of surface 83, is an overhanging stop shoulder portion 85 set radially inwardly of the cylindrical interior of side wall portion 75. This shoulder serves as an effective means for engaging and limiting the insertion of the upper end of the mixing device mid-section 71 into the bottom of the hood section 70, as will be described presently.

It will be appreciated from the showing of mid-section 71, as set out in FIGURE 3 of the drawings, that the upper end thereof comprises an annular ring or rim portion 90 having a radially projecting substantially semi-cylindrical locking bead 91 formed thereon. The outer radial extent of such bead portion 91 corresponds substantially to the larger base diameter defined by the sloping annular surface portion 81 at the bottom end of the hood section base portion 76. In interlocking operation, bead 91 engages surface 81 of the hood section and is guided therealong, to radially compress the rim portion 90 of the mixing means mid-section 71 past ridge 80 of the hood section. Thereafter the compressed portion 90 of the mid-section 71 snaps radially outwardly and bottoms in the groove formed between surfaces 82 and 83 axially inwardly of the lower end of the hood sections base portion 76. This serves to positively but detachably interlock the lower end of the hood section and the upper end of the mid-section 71 in the manner clearly set out in FIGURE 4 of the drawings.

Turning now to the structural features of the mid-section 71 for the mixing device 50 illustrated in FIGURE 3 of the drawings, it will be recognized that this component of the mixing device comprises a substantially unitary member having a generally hourglass shaped interior chambering comprising a generally funnel shaped frusto-conical upper chamber portion 92 and a similarly configured but reversely directed frusto-conical lower chamber portion 93. Such two chamber portions 92 and 93 intersect substantially medially of the vertical dimensions of the mid-section or component 71 and communicate by an open passageway therebetween of generally circular cross-sectional configuration, as designated at 94 in FIGURES 3 and 7 of the drawings.

While the two chamber portions 92 and 93 are disclosed in FIGURE 3 as being defined by correspondingly shaped frusto-conical wall portions 95 and 96 having substantially uniform wall thickness, the external configuration of such wall portions may be varied widely to any suitable configurations so long as the internal relationship of the opposed frusto-conical chamber portions 92 and 93 is maintained substantially of the order illustrated. That is to say, the mid-section 71 of the mixing means is preferably formed, as illustrated, with the two chamber portions 92 and 93 of reflective similarity symmetrically disposed on opposite sides of a central axis passing substantially medially through the cylindrical throat opening 94 therebetween. It also is to be noted that the intersection of the frusto-conical wall portions 95, 96 as herein illustrated, particularly internally, is defined by a uniform radius so as to permit and provide for smooth transition of ingredient flow between the upper and lower chamber portions 92 and 93 in operation.

Of further consequence, the smooth uniform internal configuration of upper chamber portion 92 is defiled by a swirl interrupter or barrier 98 projecting inwardly of such chamber's walls for the purpose of dampening tangential swirling flow of ingredients across and about the surface of the chamber portion 92, whereby to cause ingredients to more rapidly pass downwardly into the lower chamber portion 93 as will be amplified in greater detail hereinafter.

As set out in FIGURES 3 and 7 of the drawings, the interior wall of the lower chamber portion 93 of the mid-section component 71 is interrupted with an enlarged opening 11 which comprises an entry and communication link between the interior of the mixing device, particularly chamber portion 93 and an overdisposed trap means, indicated generally at 101. Trap means 101 comprises a generally cylindrical riser portion 102 extending upwardly from one side of the lower chamber portion 93, along a central axis which parallels the central axis of the mid-section member 71. Such riser portion 102 intersects generally at right angles with a cylindrical discharge portion 103 which extends radially beyond the general annular limits of section 71 and is adapted for insertion into one end of a related exhaust hose means 63 leading to the discharge blower 62, as previously related. It will be appreciated that the passageway provided by the two related trap portions 102 and 103 is substantially of cylindrical cross section with a sharp right angle bend therein. It is to be noted that the frusto-conical wall portion 95 of the upper chamber portion 92 for the mid-section 71 of the mixing means diagonals across the internal passageway of the trap means at the right angular bend therein; providing a wall therein indicated at 104 in FIGURE 3.

In operation, the trap causes air and airborne particles of vapor and dry ingredients in and about the mixing device to circulate in response to the evacuating operation of the blower means, causing such to rise vertically upwardly from the lowermost chamber section 93 of the mixing device's mid-section and then violently turn through the right angle bend of its internal passageway means for eventual discharge through the blower means 62. In so doing, vaporous or liquid particles in particular, tend to gather on wall portion 104 and condense for re-entry into the lower chamber 93 of the midsection 71.

The lowermost end of the mid-section 71 is defined with an annular ring portion 106 generally identical with base portion 76 at the lower end of the hood section 70. That is to say, the annular portion 106 includes an internal configuration defining an annular ridge and axially overdisposed groove 107 and 108, respectively, which lockingly receive the upper end of the bottom section 72 for the mixing device when such members are interlocked. It will be noted for instance, that the upper end of the bottom section 72 for the mixing device is formed with an annular locking bead 109 about its exterior which is adapted to be axially inserted into the locking rim 106 at the lower end of the overdisposed mid-section 71. Thus, in interlocked relationship, bead 109 of the lower section snaps into and bottoms in the groove 108 of the locking ring of the mixing device mid-section 71 as specifically shown in FIGURE 5 of the drawings.

The bottom section 72 of the mixing device 50 constitutes the lowermost component of the three part assembly thereof (see FIG. 3) and comprises a substantially frusto-conical shaped funnel body portion 110, bordered about its upper end by the annular locking bead portion 109 and defining therewithin a generally frusto-conical shaped chamber 111. A generally cylindrical discharge outlet 112 is located at the lower apex end of the chamber 111 and defined by a surroundingly cylindrical discharge wall portion 113; it being understood that the several described portions of the bottom section 72 are integrally related in a unitary member.

From the foregoing detailed description of the several components which go to make up the mixing device 50 illustrated in FIGURE 3 of the drawings, it will be readily understood that the three described components thereof are adapted for coaxial interconnection with the hood section 70 overcovering the mid-section 71 and the latter being removably attachable over the upper end of the bottom section 72. By virtue of the inherent elasticity of the material from which the three components or sections are molded, the interconnection of the components thereof occurs with initial radial compression of the upper ends of the mid-section 71 and the bottom section 72 as the upper ends of such section are thrust coaxially into the bottom ends of the overdisposed and respectively adjacent sections. Thus locking bead 91 of the mid-section engages locking groove 84 of the hood section and correspondingly locking bead 109 of the bottom section engages and bottoms in locking groove 108 of the mid-section, with snap-in activity. By virtue of this convenient mode of interconnecting the several components of the mixing means 50, such are readily disassembled for ease of cleaning and likewise lead to the versatile arrangement and ready substitution of components. Particularly, it is contemplated that the bottom section 72 of the order illustrated in FIGURE 3 of the drawings may be readily replaced by substitute bottom sections of modified structure, as illustrated in FIGURES 8 through 13 of the drawings, as will presently be described in detail.

In FIGURES 8, 9 and 10, the features of a modified lateral discharge bottom section 115 are illustrated. As shown, such modified bottom section comprises a generally annular member, preferably molded of plastic material as heretofore discussed to include an annular locking ring portion 116 at the upper end thereof including locking bead 117, in the order as locking beads 91 and 109 previously described. Thus, bottom section 115 is adapted for locking interengagement with locking groove 108 of the mid-section 71 replacing the previously described bottom sections 72 illustrated in FIGURE 3 of the drawings. The annular locking bead section 116 is merged integrally with an underdisposed body portion 118 comprising a generally concave shallow dish or pan extendinging uninterruptedly across the ring portion 116 and having a tangentially related, generally cylindrical tubular outlet or discharge portion 119, projecting laterally therefrom and at a downward slope or incline (see FIG. 9). The interior passageway of the discharge portion communicates openly with the bottom interior of the body portion to drain the latter of mixed ingredients. A locking ferrule 120 of annular configuration surrounds the cylindrical tubular body of portion 119, adjacent the outer end thereof, for purposes of sealed engagement with conventional discharge tubing or with adjacent mixing means 52, as shown in FIGURE 1.

Of particular significance is the formation of the body portion 118 to accommodate the integral extension therefrom of the tangential discharge outlet means 119. As best seen in FIGURE 10 of the drawings, body portion 118 includes a substantially planar bottom wall 121 which slopes downwardly in two directions from an annular lip wall or surface 122, internally bordering locking bead portion 116. Wall 121 merges with a generally triangular shaped side wall 123 aligned tangentially with the outlet means 119. In a somewhat similar fashion a curved, generally triangular shaped wall portion 124 extends from wall 123 across the cup-like interior of body portion 118, merging at its upper margins with the annular lip wall 122 and at its lower reaches with the inclined bottom wall 121. Thus, the interior of section 115 forms a cup-like chamber 125, having walls which all slope appropriately to gravitate materials, particularly mixed liquids and dry ingredients, into one corner of the cup-like interior chamber 125 and thereby direct the same into the discharge outlet means 119 located in such corner.

As previously mentioned, the modified lateral discharge bottom section 115 is adapted for interlocking connection within the lower end of the overlying mid-section 71 of the mixing means. In FIGURE 1 a mixing means having bottom section 115 is typified by the illustrated mixing means 51. As indicated in this figure, the discharge outlet means 119 of the bottom section 115 thereof is coupled directly with a modified lateral flow-through bottom section 130 associated with the adjacent mixing means 52, as will now be described.

Figure 12:
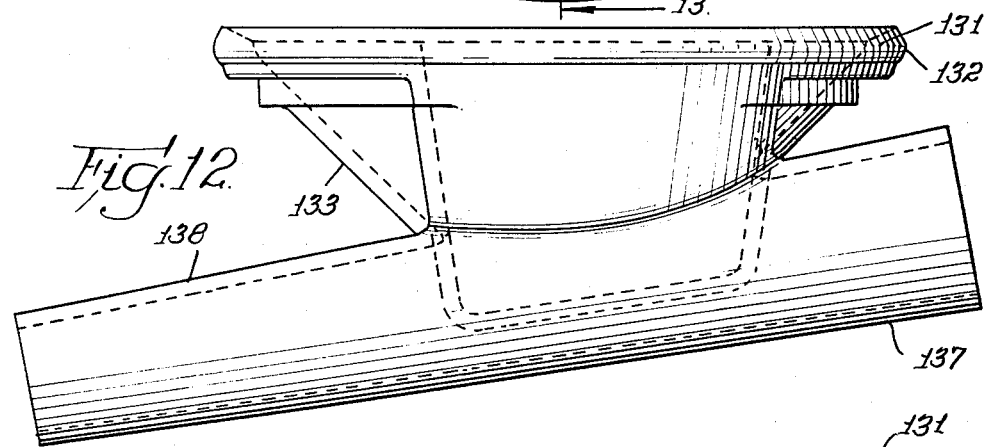
FIGURE 12 is a view in side elevation of the modified bottom section illustrated in FIGURE 11.
Figure 13:
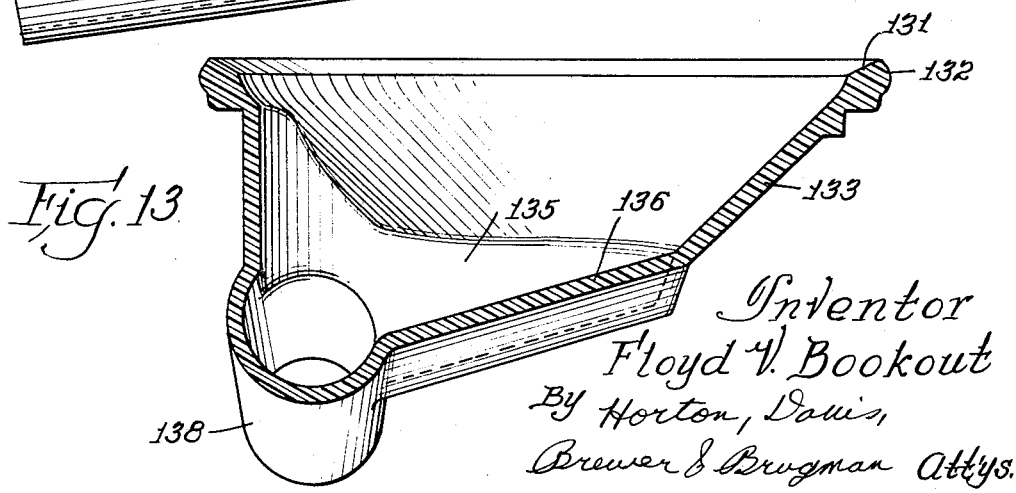
FIGURE 13 is a cross-sectional view taken substantially along vantage line 13—13 of FIGURE 11 and looking in the direction of the arrows thereon.

Referring to FIGURES 11 through 13 of the drawings, the lateral flow-through bottom section 130 is therein illustrated in detail as comprising an annular locking ring portion 131 defining the upper end of the section 130 and having an external locking bead 132 thereon for interlocking connection with the locking groove 108 of an associated mid-section 71, in the manner illustrated in FIGURE 5 of the drawings. Formed integrally with the bead portion 131 is a generally concave or cup shaped body portion 133 extending below and across the ring portion 131. A depressed well or sump means 134 bordered on three sides by wall portion 135 and having an inclined bottom wall 136 is formed in the bottom of body portion 133. The sump means communicates at its lowermost reaches with a generally tubular inlet portion 137 which enters the sump at one side thereof and is coaxially aligned with a tubular discharge or outlet portion 138 aligned generally tangentially with the cup-like interior of the sump means. It will be noted particularly from FIGURE 12 of the drawings, that the tubular inlet and outlet portions 137 and 138 are preferably tapered slightly and that while such portions are separated by the intervening sump well at the bottom interior of the section 130, the same are, in fact, coaxial continuations of a downwardly inclined passageway passing laterally through section 130. As indicated previously in describing modified lateral discharge bottom sections 115 of FIGURES 8 through 10 of the drawings, the discharge outlet means 119 of the latter is adapted to interfit with the inlet portion 137 of the modified flow-through bottom section 130. To the latter end, the sealing ferrule portion 120 of bottom section 115 seats radially within the tubular interior of the inlet portion 137, effecting liquid tight sealed engagement therebetween. This assembled relationship is shown best in FIGURE 1 of the drawings. When so assembled, it will be readily appreciated that the liquids discharged from mixing means 51 flow directly into the inlet portion 137 and out through the discharge portion 138 of the modified flow-through bottom section 130 illustrated in FIGURES 11 through 13 of the drawings. Thus, such two bottom sections are adapted for tandem coupling, if desired, in the manner depicted in FIGURE 1.

From the above detailed description of the mixing means 50 and its several components, and the alternate bottom sections 115 and 130, it will be understood and recognized that the mixing means 50 may be quickly modified into a mixing means 51 or 52 by merely replacing its bottom section 72 with an appropriate modified bottom section 115 or 130.

While those familiar with the art will understand and appreciate the unique features of the described mixing apparatus 21 and the particulars of the several mixing means 50–53 thereof as above described, the functioning thereof particularly in association with the dry ingredient storage means 22, illustrated in FIGURES 1 and 2, will now be described briefly. With reference to FIGURE 2, it will be seen that each of the several bins or canisters 56–60 of storage means 22, comprises a discrete hollow container adapted to be supported upright on the commodity shelf 61 for storing dry flavoring ingredients, for example, as labeled thereon in FIG. 1. Discharge auger means 140 extend across the lower interior of each canister in open communication with powdered ingredients 141 stored therein; such auger means 140 being conventionally coupled to drive motor means 142 by detachable coupling means 143 and suitable speed reducing drive means 144. In a known manner, periodic rotation of auger means 140, in response to customer deposit of appropriate coin value in the vending machine, causes measured amounts of powdered ingredients to be discharged through the discharge end 145 of the auger means associated with one or more storage bins as selected. A downwardly directed discharge chute means 146, located over the discharge end of the auger means directs such measured dry ingredients into underdisposed mixing means. It will be noted that whereas the ingredients discharged from canisters 56, 57 and 58 fall directly into the hood sections of mixing means 51, 52 and 53, ingredients (powdered cream and sugar) discharged from canisters 59 and 60 are channeled into the upper end of a common mixing means 53 by intervening chute means 147.

Regardless of which of the mixing means 50–53 is considered, the mixing activity and general functioning thereof is substantially the same. For a better understanding of the unique mixing operation performed thereby, reference is again made to FIGURE 3 of the drawings, from which it will be understood that when the several component sections 70, 71 and 72 therein illustrated are interlocked in the manner heretofore described, assembled mixing means 50 (see FIG. 1) results. Since the principles of operation for the several mixing means indicated in FIGURE 1 are substantially alike, except for the direction of discharge flow therefrom, as provided by the selected bottom section components, a description of mixing means 50 will suffice for all.

In accordance with predetermined vending cycles of an associated vending machine, selection of a mixed drink by the customer and the deposit of appropriate coin value in coin receptive means of familiar design, initiates the discharge of measured amount of liquid into the upper end of mixing means followed shortly thereafter by the discharge of dry ingredients through opening 80 of the hood section thereof. In the case of mixing means 50, in the particular illustrated embodiment, the liquid introduced into the hood section thereof via the water supply tube 61 is cold or chilled for intermixing with the dry malted milk mix ingredients stored in canister 56. As previously described, water entering the hood section 70 of mixing means 50, flows tangentially about the interior walls of the same in a swirling fashion, wetting such walls prior to dropping dry ingredients through opening 80 from the overdisposed canister means 56. This procedure substantially lessens any tendency of the dry ingredient powder to adhere to the internal walls of the hood section 70. Substantially simultaneously with or just prior to the feeding of the water into the hood section 70, blower means 62 is energized to effectively draw a partial vacuum in the hollow interior of mixing means 50. Thus water and dry ingredients introduced into the hood section are effectively drawn downwardly into the interior of mixing means 50 in deference to such vacuum, along with a considerable volume of air from about the exterior thereof. Such downward air flow through opening 80 substantially prevents the escape of vaporous and dry ingredient particles into the atmosphere exteriorly of the mixing means, particularly when such dry ingredients are dropped through opening 80 thereof. As the liquid and dry ingredients swirl about the inside walls of the hood section and the interior frusto-conical walls of upper chamber portion 92 associated with the central mid-section 71, an effective wetting and partial dissolution of the dry ingredients takes place. It is particularly important to recognize that the swirling motion or activity of the ingredients over the frusto-conical walls of chamber portion 92 is in the nature of a vortex converging at throat 94 and having a fairly high flow velocity. During this stage, effective pre-mixing of the dry and wet ingredients takes place. As such pre-mixed ingredients pass through the throat portion 94 between the upper and lower chambers 92 and 93 of the mixing device, the flow velocity thereof, assisted somewhat by the rush of air downwardly through the throat portion 94 and thereafter upwardly through trap means 101, causes the ingredients to radiate outwardly in a reverse or diverging vortex flow so that the ingredients closely hug and wet the interior walls of the chamber portion 93 of the mixing means. This latter activity in particular is most effective in cleaning the walls of chamber portion 93 and maintaining the same free of residue. Final mixing of the ingredients takes place in the mixing bowl defined by chamber portion 93 of the mid-section 71 and the chamber 111 of the bottom section 72, with entry of ingredients into the latter chamber again reversing the direction of vortex flow or radial movement of the ingredients in accordance with the frusto-conical formation of chamber 111. During this stage, the transition from a diverging vortex flow in chamber portion 93 to a converging vortex flow in chamber 111 turbulates the ingredients, creating a favorable homogeneous intermixture thereof and dampening or lessening the swirling motion and flow activity of the ingredients so that the same discharge rather rapidly through the vertical discharge outlet means 113 of bottom section 72 employed in mixing means 50.

When employing the modified lateral discharge and flow-through discharge bottom sections 115 and 130, respectively, the above-described swirling activity of the ingredients, particularly in the mixing bowl of the mixing means, assists the tangential discharge flow therefrom. Generally speaking, however, each of these modified bottom sections produces a greater retention time of ingredients within the mixing chamber than results with use of the bottom section 72 having a vertical drop discharge as described. Thus complete dissolution of dry ingredients within the mixing bowl itself is of greater probability when utilizing either of the modified discharge sections 115 or 130 than with bottom section 72. This factor is of significant importance in selecting the particular style of discharge section for the mixing means according to this invention especially when considering the solubility characteristics of a particular dry ingredient mix.

It is important to recognize that during the period the ingredients are flowing within the hourglass chambering of the mixing means, the passage and flow of air in response to the circulating activity of the blower means 62, reverses upwardly upon entering trap means 101. This action effectively captures with the air any released vaporous and dry ingredient particles in the mixing bowl atmosphere, so that the same are carried upwardly into the trap means 101 via the vertically disposed portion 102 thereof. In the case of heavier liquid particles, the reverse directional movement thus described, substantially dissipates their kinetic energy so that when such vaporous particles impinge the sloping wall portion 104, which angles across the upper end of the vertical passageway of trap portion 102, the same exhibit a marked tendency to gather on wall 104, coagulate and eventually gravitate downwardly into the mixing chamber in the form of droplets along with dry particles wetted thereby. Meanwhile, any vaporous or dry ingredient particles which are not collected in this manner pass harmlessly to the exterior of vending machine cabinet via the exhaust blower 62 and tubing 63 connected to the discharge portion 103 of the trap means.

As a precautionary measure, to insure sanitary condition of the generally self-cleaning mixing means, the interior walls thereof may be flushed after or as the mixed ingredients are discharged therefrom to the vending stage or intervening whipper assembly. This is best accomplished by a secondary water feed cycle of short duration or by prolonging the normal water feed cycle slightly beyond the dry ingredient feed cycle thereto. It will be understood, that such flushing liquids completely wet and flush clean all the internal walls of the mixing means, in accordance with the vortex flow activity above-described. Such flushing liquids eventually join the ingredients previously mixed in the mixing means either during the stage when the latter are being whipped in the whipper assembly 54 or at the dispensing station of the vending stage when the mixed drink ingredients are deposited in a cup for delivery to the customer.

From the foregoing operational description of mixing means 50, it is believed that the general overall operation of the mixing apparatus 21 of this invention comprising a plurality of such mixing means will be readily understood. However, briefly in accordance with the illustrated embodiment of apparatus 21 set out in FIGURES 1 and 2 of the drawings, it will be appreciated that according to such organization, mixing means 50 is intended to admix the cold drink ingredients such as malted milk mix, and cold water. While as hereinabove described, there is adequate intermixture and dissolution of such ingredients within the mixing means 50, the emulation of the whipped character of a malted milk is carried out best by discharging the mixed ingredients from mixing means 50 into the whipper assembly 54, as illustrated. This not only further enhances homogeneous intermixture and dissolution of the ingredients during the whipping operation but also traps a certain amount of air therewithin the produce an end malted milk drink of a generally creamy and frothy consistency. The discharge from whipper assembly 54, of course, is fed to a cup at the vending stage 23 of the vending machine in a known manner.

With the tandem organization of the several mixing means 51 and 52, and the coupling of their discharges commonly into mixing means 53, as illustrated, it will be readily appreciated that the hot coffee or tea drinks mixed therein are fed to the mixing means 53, whereat selected amounts of dry sugar or dehydrated cream are added according to the customer's selection. Preferably, as illustrated, the discharge of mixing means 53 is fed into a below disposed whipper assembly for mixing of the sugar and cream and thence gravitationally drained into a cup at the vending stage 23 as deposited from the cup-drop means 24. It will be understood that, by the functioning of the above-described apparatus 21 according to this invention, the novel mixing means 50–53 are readily adapted to the mixing of either hot or cold drinks in a single mixing apparatus and vending machine to accomplish that desirable objective. Further, it will be recognized that the particular organization and arrangement of the several components for the individual mixing means as above described, is illustrative only of the versatility of this invention and that the same is by no means limited to the particular arrangement set out in the described preferred embodiment. For example, it is fully contemplated that the tandem arrangement of mixing means 51 and 52 and 53 may be entirely avoided if found desirable and replaced by independent mixing means in the order of mixing means 50. Similarly, it is well within the purview of this invention that mixing means 50 be equipped with the described modified lateral discharge bottom section 115 and the latter equipped with a flow-through discharge section 130 whereby to couple all mixing means in tandem. In making such modification, however, it should be noted that chocolate flavored mixes, such as chocolate malted milk, cocoa or the like, are preferably mixed and dispensed by separate mixing means due to the propensity of the chocolate to contaminate other drink flavors, such as coffee or tea. For that reason it is recommended that the connecting of chocolate drink discharge commonly with other drinks to be vended be avoided, as in the preferred embodiment illustrated.

Having thus described the various aspects and features of the present invention, it is believed that those familiar with the art will readily recognize its unique advantages which mark the same as a novel advancement in this art. Further, while the present invention has been described in association with a preferred illustrated embodiment thereof, it is to be understood that numerous changes, modifications, and substitutions of equivalents may be adopted and made therein without necessarily departing from the spirit and scope of this invention. Therefore, it is intended that the present invention be unlimited by the foregoing description except as may appear in the following appended claims.

I claim:

1. In a mixed drink vending machine, apparatus for mixing dry and liquid beverage forming ingredients comprising: a plurality of adjacently related individual mixing devices each having internal chambering of generally hourglass configuration productive of converging and diverging vortex flow of ingredients therethrough, means for introducing liquid ingredients tangentially into one end of said chambering of each device as selected, means for introducing predetermined dry ingredients into said liquid as the same is introduced into said chambering, discharge means at the other end of said chambering for gravitationally discharging mixed beverages therefrom, and means feeding such mixed beverages discharged from selected mixing devices into the upper interior of one of said mixing devices for admixing additional ingredients therewith.

2. The combination of claim 1 wherein each mixing device includes trap means having a circuitous passageway means communicating with said chambering adjacent said other end thereof for trapping air borne ingredient particles, and air circulating means communicating with said trap means and thereby with said chambering; each mixing device having an opening through said one end thereof for the tangential introduction of said liquid and dry beverage forming ingredients but otherwise having its internal chambering enclosed except for said trap means whereby operation of said air circulating means forces air to circulate through said opening, chambering and trap means to capture liquid and dry ingredient particles from the atmosphere within and about said mixing device.

3. In a mixed drink vending machine, apparatus for mixing dry and liquid beverage forming ingredients comprising: a plurality of adjacent unitary mixing devices, each having vertically aligned internal chambering of generally hourglass configuration operationally productive of successive converging and diverging vortex flow of ingredients therethrough, means for periodically introducing preselected liquid ingredients tangentially into the upper interior chambering of each device as selected, means for introducing predetermined dry ingredients into said liquid within said chambering, means communicating with the lower interior of said chambering of each device for discharging mixed beverages therefrom, and means associated with the discharging means of selected said mixing devices for conducting mixed beverages therefrom into the upper interior of one of said mixing devices for admixture with additional dry ingredients therewithin.

4. The combination set forth in claim 3 wherein each of said mixing devices comprises a three section structure comprising an upper annular hood section, a lower annular discharge section and an intermediate mid-section, said three sections being detachably interconnected; each of said sections having a hollow interior defining a chamber portion such that the assembly thereof serves to define an upper pre-mixing chamber and a lower mixing chamber interconnected by a reduced throat portion, definitive of said hourglass chambering.

5. The combination as set forth in claim 4 wherein said hood section of each mixing device is rotatably connected to said mid-section and has tangential liquid inlet means and a semi-annular dry ingredient opening through an upper wall thereof whereby said inlet means and opening may be variously positioned about the central axis of said mixing device for receiving ingredients from selected aspects.

6. The combination of claim 3 and motorized whipper means receptive of mixed ingredients discharged from said one mixing device.

7. For use in mixing apparatus of the class described, a self-cleaning mixing device comprising a unitary assembly of an upper hood mid-section, an intermediate section, and a lower bottom section, said hood and bottom sections having hollow interior chamber portions and said intermediate section having a pair of oppositely directed upper and lower frusto-conical chamber portions interconnected by an inermediate cylindrical throat portion communicating between the apical ends of said frusto-conical chamber portions; annular locking means formed on adjacent opposing ends of said sections for detachably interlocking the same to form an assembly enclosing a hollow interior chambering of general hour-glass configuration aligned coaxially of an operationally upright axis; said hood section having an opening in an upper wall thereof and inlet means for respectively receiving dry and liquid beverage forming ingredients tangentially into its hollow interior and said bottom section having discharge outlet means for the discharge of ingredients from its chamber portion; said assembly operating to effect successive converging and diverging vortex flow of ingredients gravitationally through said chambering to flush and clean all walls thereof.

8. The combination set forth in claim 7 including trap means formed on said mid-section and communicating with the lower frusto-conical chamber portion thereof and the chamber portion of said bottom section; said trap means being operatively associated with forced air circulating means whereby to exhaust the atmosphere of said internal chambering and assist the gravitational vortex flow of ingredients therethrough.

9. The combination as set forth in claim 7 wherein each said section is formulated as a unitary molding of resilient plastic material whereby said locking means on adjacent ends of said sections may be nested concentrically one within the other and coaxially interlocked with resilient snap-in engagement of locking beads and grooves opposingly formed thereon.

10. The combination as set forth in claim 7 in which said assembly selectively includes a bottom section having selected lateral and vertical discharge means.

11. The combination as set forth in claim 7 wherein said bottom section is provided with coaxially aligned lateral inlet means and discharge outlet means whereby the same accommodates the flow of ingredients laterally therethrough.

12. The combination of claim 7 wherein said hood section is coaxially rotatable about the central axis of said device and relative to said mid-section.

13. The combination of claim 7 wherein said bottom section is formed with frusto-conical interior chambering having its base end openly communicating with the base end of said lower frusto-conical chamber portion of said mid-section whereby to converge the divergent vortex flow of ingredients entering said bottom section from said mid-section to turbulate the same and effect improved mixture thereof.

References Cited

UNITED STATES PATENTS

| | | | |
|---|---|---|---|
| 2,755,000 | 7/1956 | Parre | 222—129.4 |
| 2,954,145 | 9/1960 | McCauley | 220—129.4 |
| 2,977,026 | 3/1961 | Delgado | 222—129.4 |
| 3,212,757 | 10/1965 | Martin | 259—4 |
| 3,300,094 | 1/1967 | Rockola | 259—4 X |

ROBERT W. JENKINS, *Primary Examiner.*